United States Patent
Noyes et al.

(10) Patent No.: US 12,371,108 B1
(45) Date of Patent: Jul. 29, 2025

(54) VEHICLE HAVING A MOVABLE CAB AND ACTUATOR

(71) Applicant: Transportation IP Holdings, LLC, Norwalk, CT (US)

(72) Inventors: Andrew Marcus Noyes, Overland Park, KS (US); Eric John Slocombe, Overland Park, KS (US)

(73) Assignee: Transportation IP Holdings, LLC, Norwalk, CT (US)

( * ) Notice: Subject to any disclaimer, the term of this patent is extended or adjusted under 35 U.S.C. 154(b) by 0 days.

(21) Appl. No.: 18/598,282

(22) Filed: Mar. 7, 2024

(51) Int. Cl.
    *B62D 33/063* (2006.01)
(52) U.S. Cl.
    CPC ............... *B62D 33/0636* (2013.01)
(58) Field of Classification Search
    CPC .................. B62D 33/0636; B62D 33/063
    See application file for complete search history.

(56) References Cited

U.S. PATENT DOCUMENTS

| | | | | |
|---|---|---|---|---|
| 2008/0258535 | A1* | 10/2008 | Berning | E01C 23/01 299/39.4 |
| 2012/0318594 | A1* | 12/2012 | Riha | B62D 33/0617 180/89.12 |
| 2020/0317278 | A1* | 10/2020 | Greenberg | E02F 5/226 |
| 2020/0369500 | A1* | 11/2020 | Henkel | B66F 9/0759 |

FOREIGN PATENT DOCUMENTS

| | | | | |
|---|---|---|---|---|
| EP | 2803561 A2 | * | 11/2014 | ......... B62D 33/0636 |
| WO | WO-2018112568 A1 | * | 6/2018 | ............. B60R 21/38 |

\* cited by examiner

*Primary Examiner* — Paul N Dickson
*Assistant Examiner* — Matthew D Lee
(74) *Attorney, Agent, or Firm* — K&L Gates LLP

(57) ABSTRACT

A vehicle includes a body having a front side, rear side, left side, and right side, and a cab that is movably coupled with the body. The cab includes a front end, a rear end, a left end, and a right end. The vehicle includes an actuator that is operably coupled with the cab and may move the cab between a first position and a second position. Moving the cab from the first position toward the second position moves the cab away from the right side of the body, and moving the cab from the second position toward the first position moves the cab toward the right side of the body.

18 Claims, 5 Drawing Sheets

VEHICLE HAVING A MOVABLE CAB AND ACTUATOR

BACKGROUND

Technical Field

Examples of the subject matter herein relate to a vehicle having a movable cab.

Discussion of Art

Vehicles and vehicle systems may move along routes or rails. When a locomotive is in a railyard, the locomotive may be moved by another vehicle, for example, a railcar mover vehicle. The railcar mover vehicle may efficiently and safely move the locomotive or other vehicles around the railyard. However, the railcar mover vehicle may be the same width or smaller than the vehicle being moved, or the railcar mover vehicle may otherwise have an obstructed view during operation. Current railcar mover vehicles may have a static cab for an operator that may have a limited line-of-sight.

Current railcar mover vehicles may include cameras that may provide the operator additional views. However, the camera system must be manually adjusted, may have operational issues, and do not provide direct visibility by the operator.

It may be desirable to have a system that differs from those that are currently available.

BRIEF DESCRIPTION

In accordance with one example or aspect, a vehicle may include a body having a front side, rear side, left side, and right side, and a cab that is movably coupled with the body. The cab may include a front end, a rear end, a left end, and a right end. The vehicle may include an actuator that is operably coupled with the cab and may move the cab between a first position and a second position. Moving the cab from the first position toward the second position may move the cab away from the right side of the body, and moving the cab from the second position toward the first position may move the cab toward the right side of the body.

In accordance with another example or aspect, a vehicle may include a frame having a front side, a rear side, a left side, and a right side that may define a frame perimeter. The vehicle may include a cab that is movably coupled with the frame. The cab may include a front end, a rear end, a left end, and a right end defining a cab perimeter. An actuator may be operably coupled with the cab. The actuator may move the cab between a retracted position and an extended position. The cab perimeter may be contained within the frame perimeter while the cab is in the retracted position, or a portion of the cab perimeter may be disposed outside of the frame perimeter while the cab is in the extended position.

In accordance with another example or aspect, a vehicle may include a frame and a cab that may be movably positioned on the frame. An actuator may be operably coupled with the cab and may move the cab between a retracted position in which the cab is positioned within the frame and an extended position in which at least a portion of the cab extends beyond the frame.

BRIEF DESCRIPTION OF THE DRAWINGS

The inventive subject matter may be understood from reading the following description of non-limiting examples, with reference to the attached drawings, wherein below.

DETAILED DESCRIPTION

Examples of the subject matter described herein relate to a vehicle with a movable cab. The vehicle(s) and vehicle systems described herein extend to multiple types of vehicles or vehicle systems. Suitable vehicle types may include automobiles, trucks (with or without trailers), rail vehicles or rail vehicle systems, buses, marine vessels, aircrafts, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together as a group. Vehicle systems may also be referred to as vehicle groups, convoys, consists, swarms, fleets, platoons, trains, etc.

In one or more embodiments, a vehicle (e.g., a railcar mover vehicle) may be designed to have a width that is approximately the same as a vehicle being moved, for example a railcar. Optionally, the vehicle (e.g., a railcar mover vehicle) may be designed to be a reduced sized with reduced clearances to accommodate travel in constricted areas, for example tunnels. The reduced size may allow the vehicle to successfully maneuver tight tunnel clearances. The reduced size may be accompanied by reduced line-of-sight for an operator of the vehicle. The vehicle may include a cab that is operably coupled with the frame or body of the vehicle to allow or permit movement of the cab relative to a body of the vehicle. The movable cab may change a line-of-sight for an operator of the vehicle, such as around obstacles, other vehicles, or the like. The cab may be movable a distance beyond the body or frame of the vehicle for an improved line-of-sight. The improved line-of-sight may contribute to safer and more efficient operation of the vehicle relative to a vehicle with a static cab.

Figure 1:
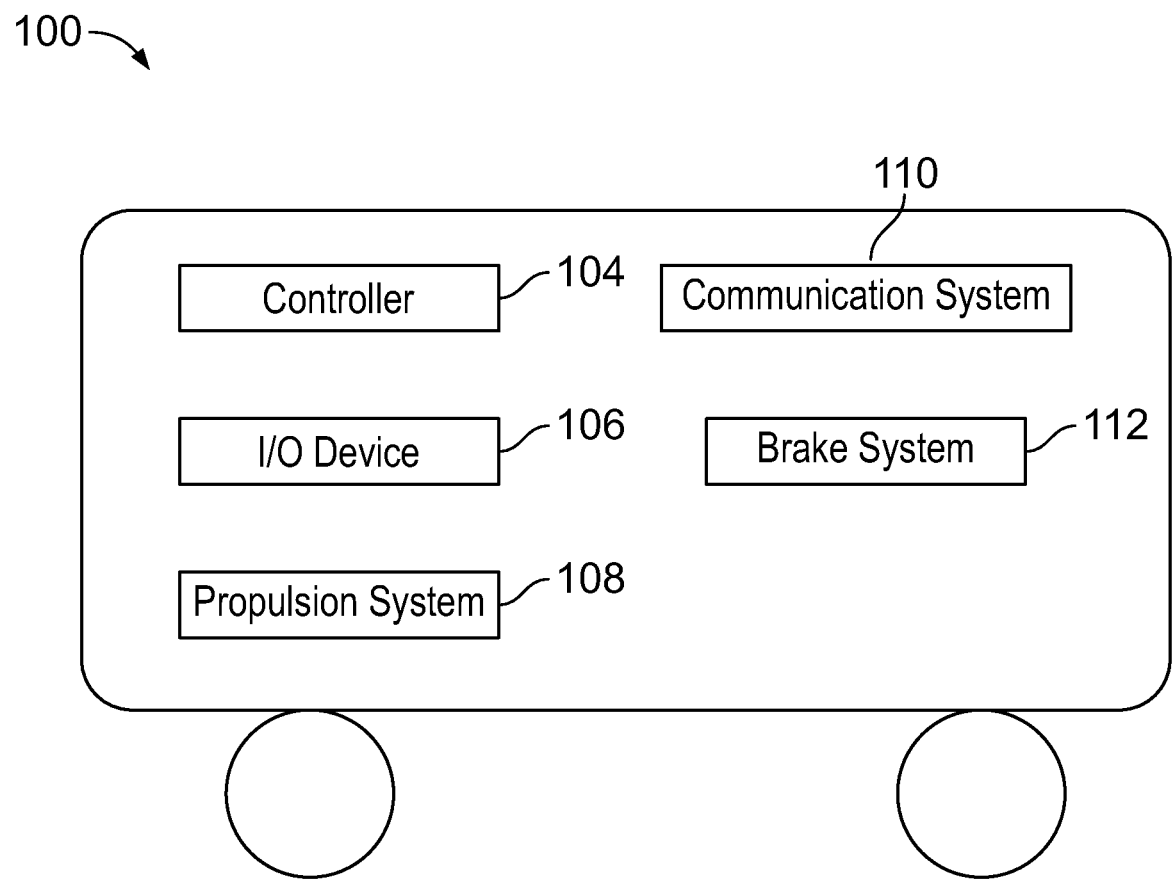
FIG. 1 is a schematic view of a vehicle, in accordance with one embodiment.

FIG. 1 illustrates a schematic of a vehicle 100 in accordance with one embodiment of the subject matter described herein. The vehicle 100 may represent a propulsion-generating vehicle, such as a railcar mover, that may be coupled with one or more other vehicles (not shown).

The vehicle may include a controller 104 that represents hardware circuitry connected with and/or including one or more processors that perform the operations described herein in connection with the vehicle. The processors may include microprocessors, microcontrollers, integrated circuits, field programmable gate arrays, or other logic devices that operate based on instructions stored on a tangible and non-transitory computer readable storage medium, such as software applications stored on a memory or database. In one embodiment, the controller can represent a vehicle controller or vehicle control unit. The controller may include a single processor or multiple processors. All operations can be performed by each processor, or each processor may perform at least one different operation than one or more (or all) other processors). For example, different processors may perform different sets or groups of the functions described herein. The processors may be in the same or different locations (such as by being disposed within or part of different devices, or within the same or different housings). The applications described herein may direct operation of the vehicle and/or other devices.

The vehicle includes a propulsion system 108 that can represent one or more components that are powered to propel the powered system or vehicle system, such as motors. Optionally, the propulsion system can include an engine and/or alternator or generator that operates to separately provide electric energy to power loads of the powered system (e.g., the motors, such as traction motors). In one or more embodiments, the propulsion system may be operably coupled with one or more energy storage devices (not shown) that may provide power to one or more components of the propulsion system. Optionally, the propulsion system may generate power that may be directed to and stored within the one or more energy storage devices. Suitable energy storage devices may store energy that may be used to power auxiliary and/or non-auxiliary loads of the vehicle system. In one or more embodiments, the auxiliary loads can be powered by the energy storage devices and/or the propulsion system to perform work that does not propel the vehicle system. For example, the auxiliary loads can include display devices, monitoring devices (e.g., sensors), or the like.

In one or more embodiments, the vehicle may be powered by one or more different fuel and/or energy types. With respect to the fuel, the fuel may be a single fuel type in one embodiment and in other embodiments the fuel may be a mixture of a plurality of different fuels. In one example of a fuel mixture, a first fuel may be liquid and a second fuel may be gaseous. A suitable liquid fuel may be diesel (regular, biodiesel, HDRD, and the like), gasoline, kerosene, dimethyl ether (DME), alcohol, and the like. A suitable gaseous fuel may be natural gas (methane) or a short chain hydrocarbon, hydrogen, ammonia, and the like. In one embodiment, fuel may be inclusive of stored energy as used herein. In that perspective, a battery state of charge, or a source of compressed gas, a flywheel, fuel cell, and other types of non-traditional fuel sources may be included. Optionally, the first vehicle, the second vehicle, and/or vehicle system may be powered by electric energy (e.g., direct and/or alternating current). One or more energy sources may provide the electric energy to one or more loads, and the energy sources may include one or more fuel cells.

The vehicle may include a brake system 112. The brake system can represent one or more of friction brakes, air brakes, dynamic brakes (e.g., one or more of the traction motors of the propulsion system that also can generate braking effort via dynamic braking), or the like. In one or more embodiments, energy generated by the brake system via dynamic braking may be directed to the energy storage device where the energy may be stored for use within other systems of the vehicle system, or may be directed to a resistor grid (such as if the battery is at full capacity or the electrical generation is at a c-rate higher than desirable for a battery). The vehicle may include an input/output device 106 ("I/O Device" in FIG. 1), such as a touchscreen, keyboard, electronic mouse, electronic display other than a touchscreen, switch, lever, button, speaker, microphone, etc., used to present information to and/or receive information from operators of the vehicle.

The devices of the vehicle may be communicatively coupled with each other by a communication system 110. The communication system can be formed from communication pathways provided by or extending in conductive pathways (e.g., cables, buses, etc., such as Ethernet cables or connections) and/or wireless pathways. Some devices may be publisher devices or publishers that generate output. Some devices may be listener devices or listeners that obtain or receive the output from the publishers to perform some operation (e.g., control of the powered system, calculation of output, etc.). Some devices may be both publishers and listeners that receive data from another device, make a calculation, determination, etc. based on the received data, and generate data as an output for another device and/or perform some action (e.g., change operation of the vehicle, such as changing a speed, throttle setting, etc., of the vehicle).

Figure 2:
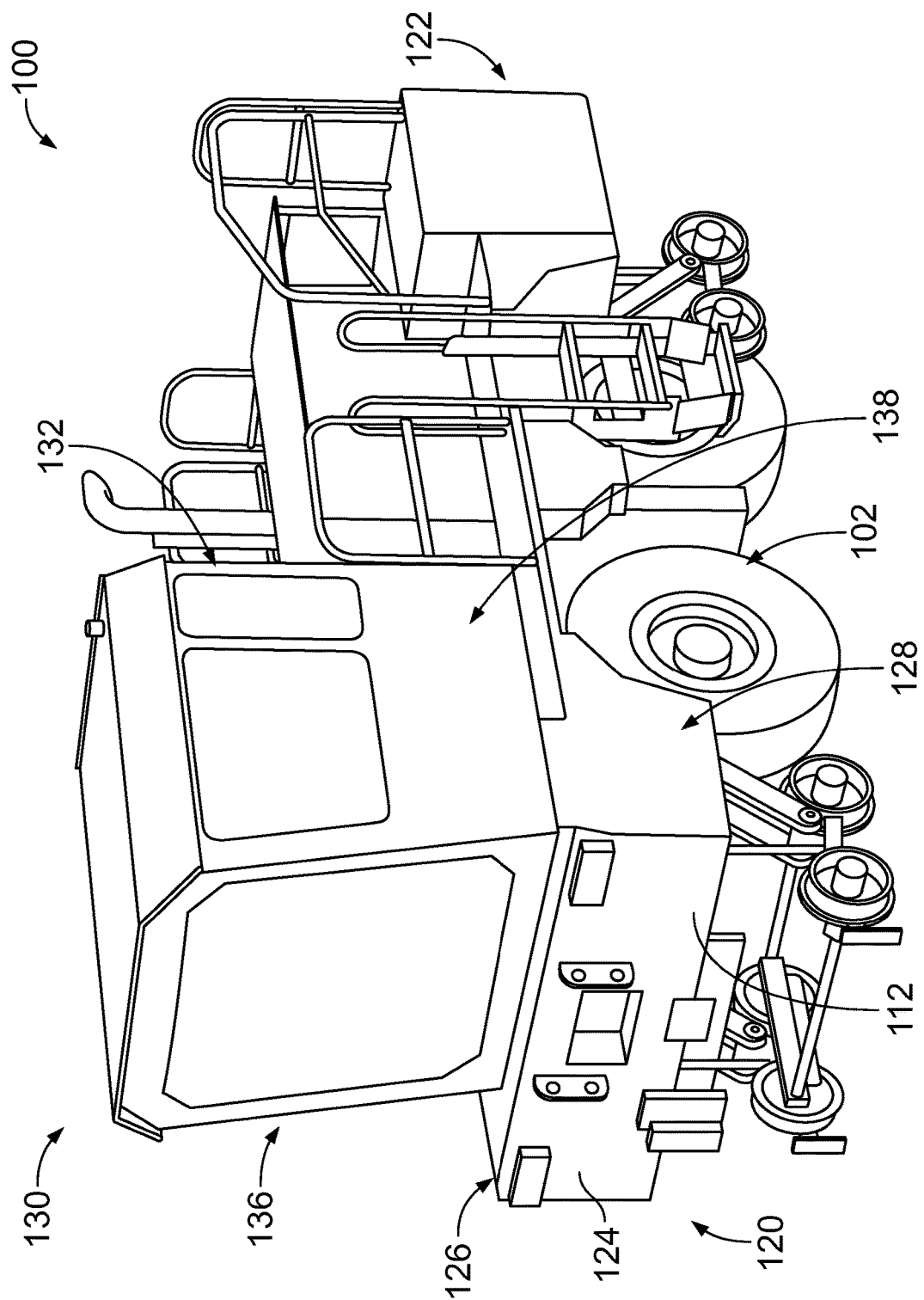
FIG. 2 is a perspective view of a vehicle in a first position, in accordance with one embodiment.
Figure 3:
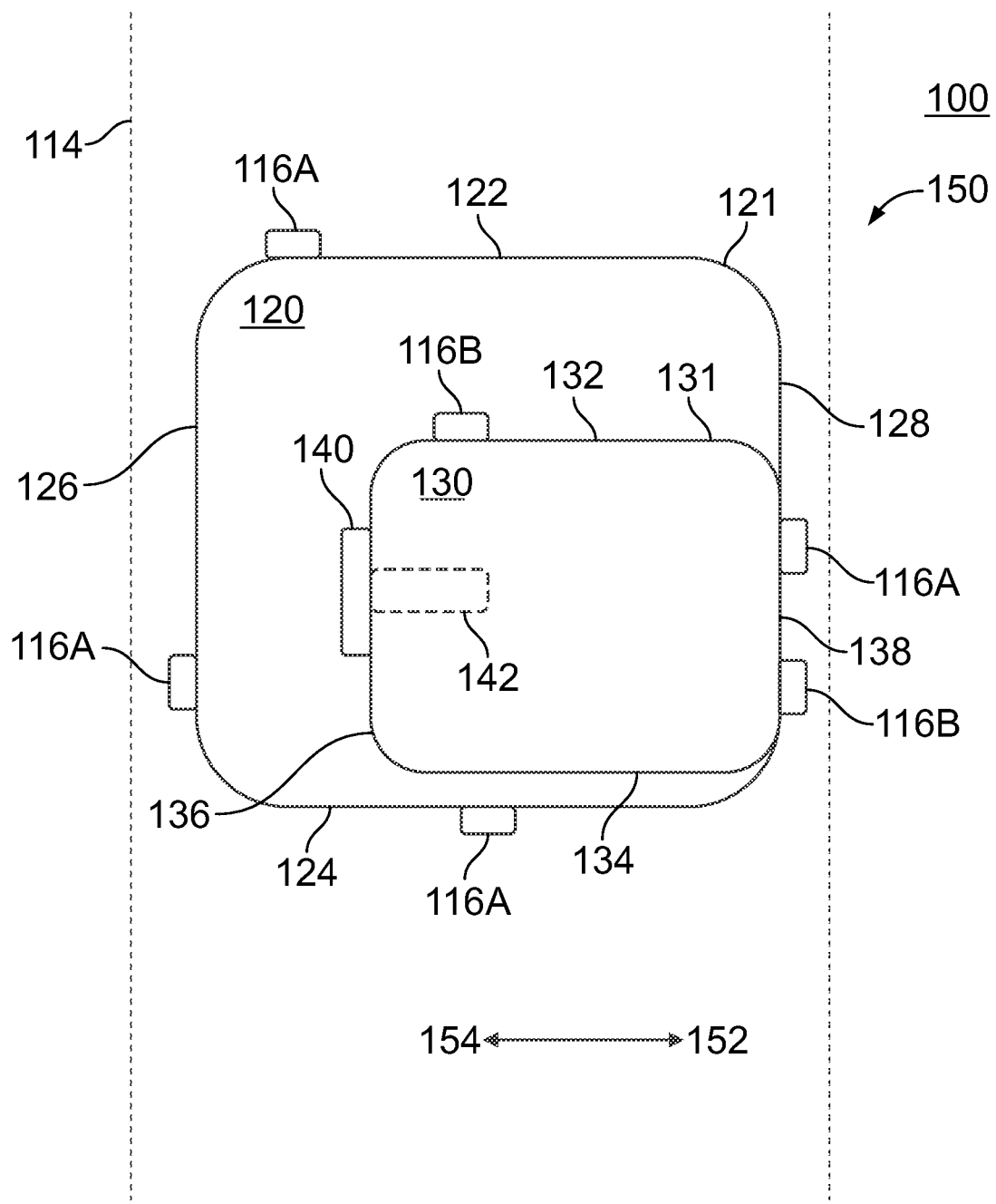
FIG. 3 is a top view of the vehicle in the first position, in accordance with one example.

FIG. 2 illustrates a perspective view of the vehicle 100 in a first position 150, and FIG. 3 illustrates a top view of the vehicle in the first position, in accordance with one example. The vehicle illustrated in FIGS. 2 and 3 is for illustrative purposes only, and in alternative arrangements and/or embodiments, the vehicle may have an alternative shape, size, orientation, arrangement, configuration, or the like.

The vehicle 100 includes a body 120 or a frame having a front side 124, a rear side 122, a left side 128, and a right side 126. The front side, rear side, left side, and right side of the body or frame define a frame perimeter 121. The vehicle may move along a route 114 in one or more different directions.

The vehicle 100 includes a cab 130 that is coupled with the body or frame. In the illustrated embodiment, a bottom surface of the cab is coupled with a top surface of the frame. Optionally, another surface of the cab may be coupled with one or more other surfaces of the frame. An operator of the vehicle 100 may be positioned within the cab such as to manually control one or more operations of the vehicle, to monitor operation of the vehicle, or the like.

The cab includes a front end 134, a rear end 132, a left end 138, and a right end 136. The front end, rear end, left end, and right end of the cab define a cab perimeter 131. In the illustrated example shown in FIG. 2, the cab perimeter 131 has a size that is smaller than a size of the frame perimeter 121. In alternative embodiments, the size of the cab perimeter may be the same or substantially the same as (e.g., within about 10%) the size of the frame perimeter.

The cab may be operably coupled with the frame or body such that the cab is allowed or permitted to move in one or more directions relative to the frame. In one embodiment, the cab may be slidably coupled with a top surface of the frame such that the cab may be allowed to slide in one or more substantially horizontal directions relative to the frame. Optionally, the cab may be movably coupled with the top surface of the frame such that the cab may be allowed to move in a substantially vertical direction away from and towards the top surface of the frame. Optionally, the cab may be coupled with the frame in one or more alternative arrangements that allows the cab to move in one or more different directions relative to the frame.

Figure 4:
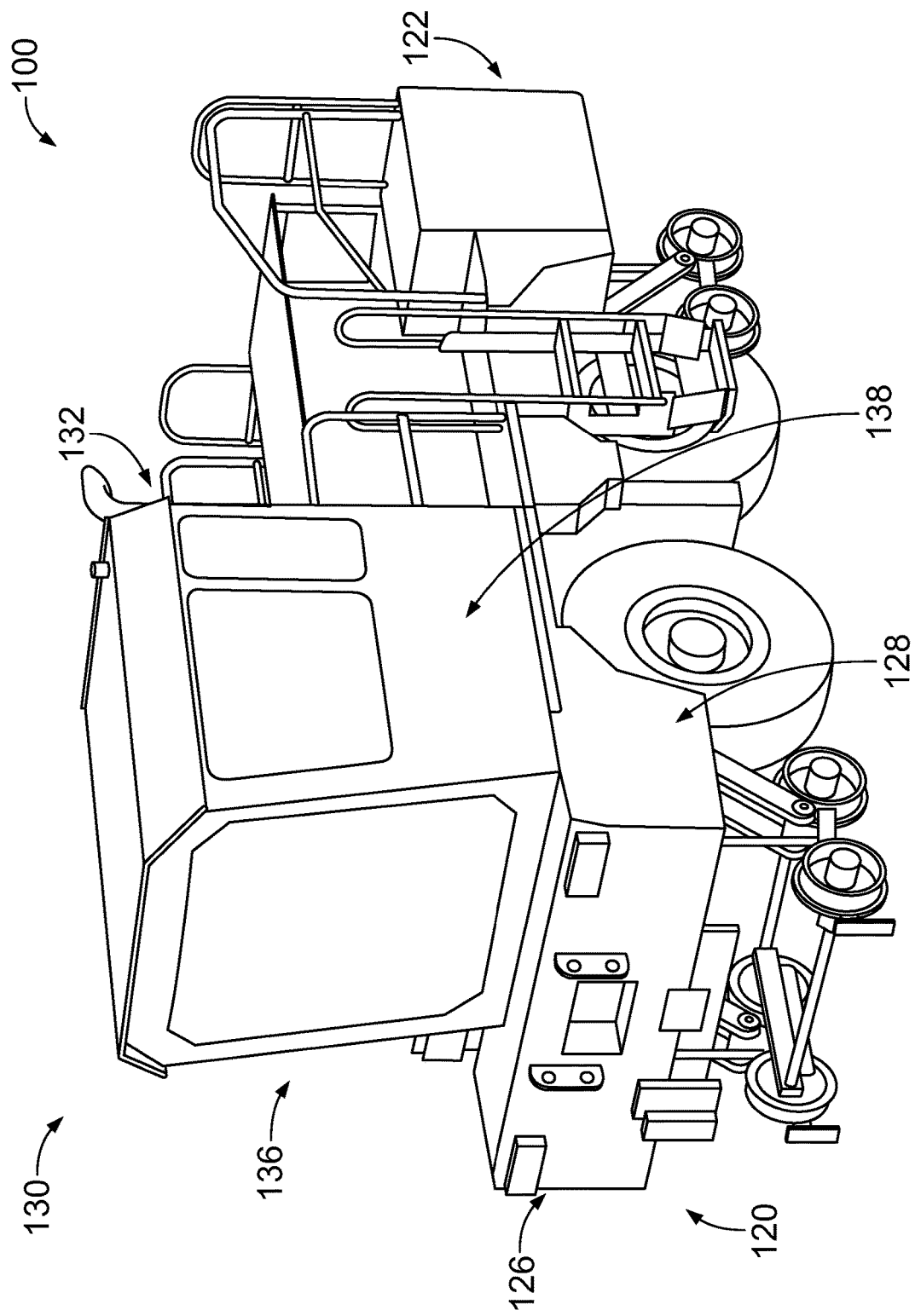
FIG. 4 is a perspective view of the vehicle in a second position, in accordance with one embodiment.
Figure 5:
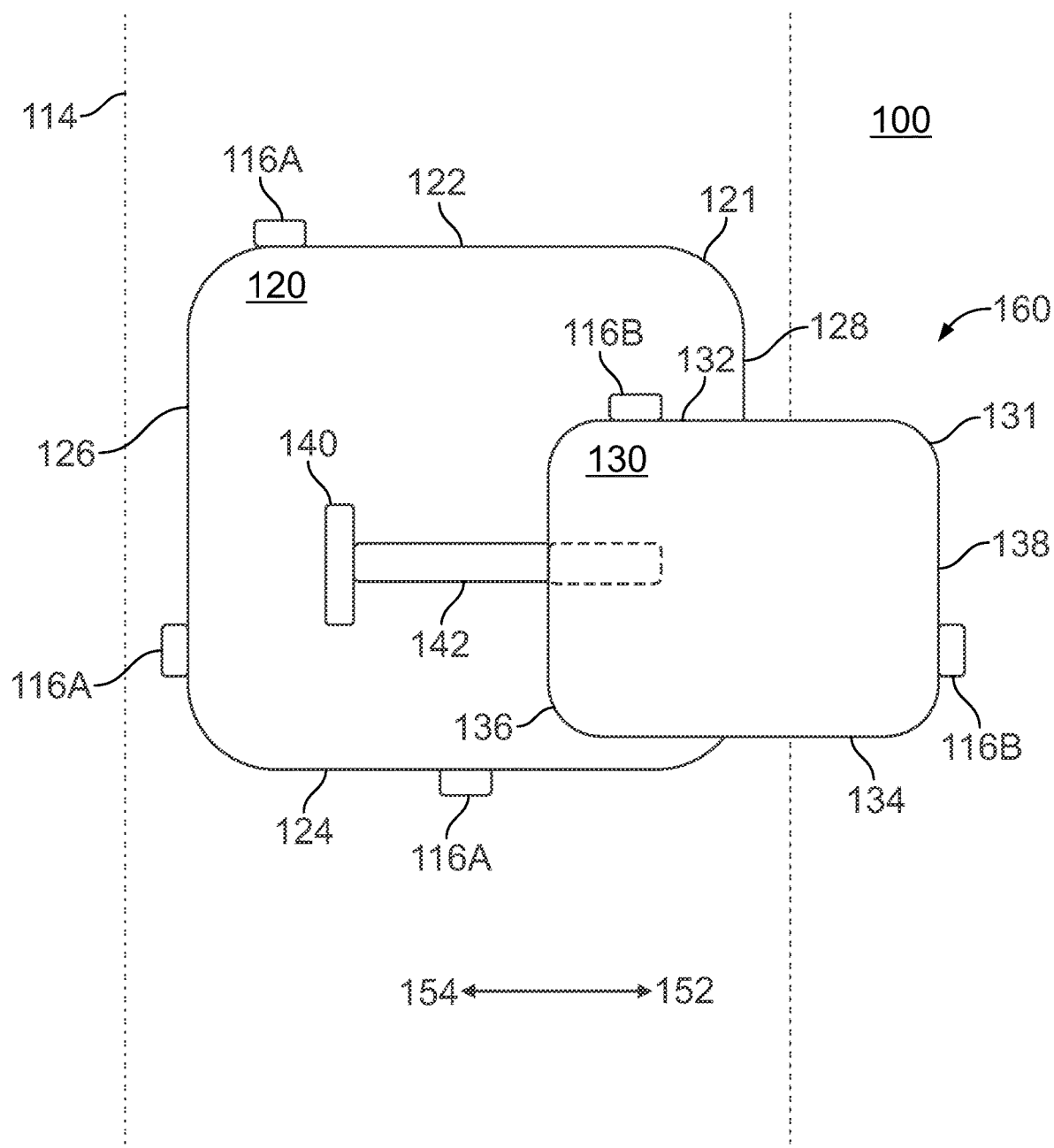
FIG. 5 is a top view of the vehicle in the second position, in accordance with one embodiment.

In the illustrated embodiments of FIGS. 2 and 3, the cab is in the first position 150. The first position may also be referred to herein as a retracted position, a fully retracted position, or the like. Alternatively, FIGS. 4 and 5 illustrate a perspective view and a top view, respectively, of the cab in a second position 160. The second position may also be referred to herein as an extended position, a fully extended position, or the like. In one or more embodiments, a distance between the first position and the second position (e.g., a travel distance of the cab, a stroke of an actuator controlling movement of the cab, or the like) may be about 6 inches (in), about 12 in, about 24 in, about 48 in, or the like. Optionally, the travel distance of the cab may be based on the size of the frame. For example, one portion of the cab may be allowed to extend beyond one surface or side of the frame, but another portion of the cab may be required to remain within the frame perimeter of the frame. Optionally, the travel distance of the cab may be limited and/or controlled based on one or more other characteristics of the vehicle (e.g., the speed of movement of the vehicle, the weight of the vehicle, a weight limitation of the operator, or the like), one or more characteristics of the route (e.g., an incline, a curvature, a type of path, etc.), one or more obstacles and/or obstructions along the route (e.g., an obstacle disposed on and/or nearby the route, a tunnel, an area with a reduced clearance, a constricted area, or the like), a stability level of the vehicle, the frame, and/or the cab, the environment in which the vehicle is moving, or the like. Optionally, the vehicle may include structural coupling devices between the cab and frame that allow all of the cab to move outside of the frame perimeter.

In the illustrated embodiments, the cab extends beyond, over, or away from the left side 128 of the body or frame such that a portion of the cab is within the frame perimeter and another portion of the cab is outside of the frame perimeter and outside of the left side of the frame. For example, the cab moves away from the right side of the frame as the cab moves toward the extended position (shown in FIGS. 4 and 5) and the cab moves toward the right side of the frame as the cab moves toward the retracted position (shown in FIGS. 2 and 3). Optionally, the cab may be positioned and/or arranged to extend beyond or over any alternative side(s) of the frame, such as the right side, the front side, the rear side, or a combination of two sides of the frame (e.g., extend over a corner of the frame).

In one or more embodiments, the cab of the vehicle may move in one or more directions relative to the frame to change a visibility of the operator positioned within the cab. For example, the cab may be positioned in the first position, and the line of sight of the operator may be obstructed by a portion of the frame, by another portion of the vehicle, by an object disposed along the route, by another vehicle moving ahead of the vehicle, or the like. The cab may move from the first position to the second position (or to an intermediate position between the first and second positions) to change the line of sight of the operator and change the visibility of the operator, such as to improve the visibility of the operator relative to the cab being in the first position.

In one or more embodiments, the cab may move in a first direction 152 to move from the first position 150 toward the second position 160, or the cab may move in a second direction 154 to move from the second position toward the first position. For example, moving the cab from the first position (shown in FIG. 3) toward the second position (shown in FIG. 5) moves the cab away from the right side 126 of the body or frame. For example, the cab is positioned over the left side of the body or frame. Alternatively, moving the cab from the second position toward the first position moves the cab toward the right side of the body or frame. Additionally, the cab perimeter 131 is contained within an area defined by the frame perimeter 121 while the cab is in the first or retracted position (as illustrated in FIG. 3). Alternatively, a portion of the cab perimeter is disposed outside of the area defined by the frame perimeter 121 while the cab is in the second or extended position (as illustrated in FIG. 5). For example, a portion of the cab is extended away from the left side of the frame of the vehicle while the cab is in the extended or second position.

In one or more embodiments, the vehicle may include one or more structural components, structural devices, assemblies, arrangements, or the like (not shown) disposed between the cab and the frame that allow the cab to move relative to the frame between the first position and the second position. For example, the vehicle may include shafting (e.g., steel shafting), mounting brackets, bearing assemblies (e.g., roller bearings, pillow block bearings, or the like), rollers or roller assemblies, rack-and-pinion devices, one or more stops or stopping devices, or the like.

In one or more embodiments, the vehicle may include an actuator 140 that is operably coupled with the cab 130. In the illustrated example, the actuator 140 includes an actuator arm 142 that extends a distance away from the actuator. In one or more embodiments, the actuator arm may represent a telescoping portion of the actuator. In the illustrated embodiment of FIG. 3, the actuator arm is in a retracted position. Alternatively, in the illustrated embodiment of FIG. 5, the actuator arm is in an extended position.

In one or more embodiments, the actuator may be a current electronic actuator, a hydraulic actuator, a pneumatic actuator, a charged accumulator, or the like. Optionally, the vehicle may be devoid an actuator an actuator arm, and the cab may be moveable relative to the frame with an alternative locking pin or other locking arrangement. Optionally, the vehicle may include one or more pads (e.g., friction pads, dampers, dampening devices, or the like), rollers, bearings, rack-and-pinion devices (not shown) that may encourage, permit, or otherwise assist sliding motion of the cab relative to the frame.

In one or more embodiments, the controller (shown in FIG. 1) may control operation of the actuator to control movement of the cab. For example, the controller may automatically control operation of the actuator to move the cab from one position to another position (e.g., without operator input), or in another example an operator may manually control operation of the actuator via the controller to move the cab from one position to another position.

The actuator may control movement of the cab between the first position (e.g., the fully retracted position), the second position (e.g., the fully extended position), and one or more intermediate positions between the first and second positions. In one or more embodiments, the cab may move between the one or more intermediate positions via a stepping arrangement, such as one or more steps or notches of travel between the first and second positions. Optionally, the cab may move between the first and second positions in a single, smooth arrangement of movement (e.g., without steps or notches).

In one or more embodiments, the actuator may control the cab to move in a first arrangement from the first position to the second position and may move in a second arrangement from the second position to the first position. In one or more embodiments, the first arrangement may include steps, notches, travel limits, or the like, and the second arrangement may be a smooth or single movement without steps, notches, travel limits, or the like. Optionally, the actuator may control the cab to move in the first arrangement toward the extended position, and the same or a similar first arrangement toward the retracted position. In one or more embodiments, the steps and/or notches of the first arrangement of travel may be predetermined or preprogrammed, and may be substantially equally spaced apart from each other based on a total stroke of the actuator arm, and the cab may be allowed to move to the predetermined equally spaced apart notches. Optionally, the operator may manually control operation of the actuator to move the cab between the one or more intermediate positions to one or more manually selected steps, notches, stops, or the like, that may not be equally spaced apart from each other.

In one or more embodiments, the vehicle may include one or more sensors 116 that are operably coupled with the frame and/or the cab. In the illustrated embodiment of FIG. 3, the vehicle includes plural sensors 116A that are coupled with plural sides of the frame and plural sensors 116B that are coupled with plural ends of the cab. In one or more embodiments, the sensors may be optical sensors (e.g., still and/or video cameras), temperature sensors, global positioning sensors, speed sensors, accelerometers, or the like.

The sensors may detect or otherwise sense one or more characteristics of the vehicle, characteristics of the route along which the vehicle moves, characteristics of objects disposed within and/or along the route, characteristics of a predetermined area surrounding the vehicle, characteristics of ambient conditions to which the vehicle is exposed, or the like. The sensors may detect or sense the characteristics and may communicate the sensed data with the controller, with an off-board control system (not shown), or the like. For example, the sensors may be communicatively coupled with the controller via the communication device. The controller may receive outputs of measured values from the sensors and may identify or diagnose an operational state of the vehicle.

In one or more embodiments, the I/O device (shown in FIG. 1), such as a display device of the vehicle, may display information received by the controller from the one or more sensors. For example, one or more of the sensors may be optical sensors, and a display device of the vehicle may display the images and/or video obtained by the sensors. The images and/or video may be live or current images and/or video of the vehicle, of the route, of the area surrounding the route, of the cab, of the position of the cab relative to the frame, or the like. The display device may display the information obtained by the sensors, such as to the operator of the vehicle. Optionally, the sensor data may be communicated with an off-board control system, and a display device of an off-board control system may display the information to a remote operator of the off-board control system (e.g., an operator that is disposed off-board the vehicle).

In one or more embodiments, the operator (e.g., of the vehicle or of the off-board control system) may manually control operation of the actuator based at least in part on the information that is displayed via the display device of the vehicle. For example, the operator may identify an obstacle positioned in an upcoming portion of the route in the image displayed via the display device, and may control movement of the cab based at least in part on the detection of the obstacle. In one or more embodiments, the obstacle may be an object and/or person disposed on and/or proximate to the route, may be an area with a reduced clearance, a constricted area such as a tunnel, or the like. Optionally, the operator may control one or more operating settings of the vehicle (e.g., a throttle setting, a brake setting, or the like) based at least in part on the image that is displayed via the display device.

In one or more embodiments, the controller may automatically control operation of the actuator to control movement of the cab based at least in part on the sensed data received from the sensors. For example, one or more of the sensors may detect an object or obstacle that is disposed along the route 114, such as within a predetermined surrounding area of the vehicle. The controller may determine a position of the cab (e.g., in the first position, the second position, or one or more intermediate positions) and may determine that the cab and/or the frame may collide with or interfere with the object or obstacle detected by the one or more sensors based at least in part on the position of the cab, the location of the obstacle, the speed of movement of the vehicle, or the like. The controller may automatically control operation of the actuator to move the cab based at least in part on the detection of the obstacle along the route, such as to prevent the cab from colliding with the obstacle. Optionally, the controller may control a speed of movement of the actuator arm (e.g., to speed up the movement of the cab from the second position toward the first position) based on a location of the obstacle, the speed of movement of the vehicle, or the like.

In one or more embodiments, the controller may control operation of the actuator to control movement of the cab based at least in part on one or more characteristics of the route or an upcoming portion of the route. For example, the one or more characteristics of the route may include a curvature of the route, an incline of the route, an elevation of the route, a type of path of the route (e.g., paved or unpaved), or the like.

For example, the controller may control operation of the actuator based at least in part on a curvature of the route, or a curvature of an upcoming portion of the route. For example, the controller may determine or identify a position of the cab (e.g., in the first position, the second position, or the one or more intermediate positions). The controller may also determine that the position of the cab may need to change based on the curvature of the route or the curvature of an upcoming portion of the route. For example, the cab may be in a too extended position for an upcoming portion of the route and may need to more toward the first position such as to control a stability level of the vehicle while the vehicle moves along the curved portion of the route.

In one or more embodiments, the controller may control operation of the actuator to control movement of the cab based on a stability level of the vehicle. For example, the controller may determine that the position of the cab may need to change based on a level of stability of the vehicle being outside of a determined level of stability or a stability threshold. For example, the cab may be in a too extended position, such as to position a center of gravity of the cab at a location that impacts a center of gravity of the frame. The controller may determine that the position of the cab may need to move (e.g., toward a retracted position) such as to change the center of gravity of the cab. Moving the cab toward the retracted position may change the stability level of the vehicle to be within the determined level of stability or stability threshold.

In one or more embodiments, the controller may control operation of the actuator such as to override a manual input by the operator of the vehicle. For example, the operator of the vehicle may manually control the actuator (e.g., via the I/O device) to move the cab from the first position to the second position. The controller may determine, however, that an obstacle is positioned along the route and moving the cab to the second position would cause the cab to collide with the obstacle. The controller may override the manual instructions provided by the operator and may prevent the actuator from moving the cab to the second position. Optionally, the controller may override the manual instructions and may prevent the actuator from moving the cab to the second position, but may control the actuator to move the cab to an intermediate position to extend the cab but prevent a collision between the obstacle and the cab.

In one embodiment, the controller and/or an off-board control system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller and/or control system may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the control system may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle control system executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., a location or change in location of the vehicle, a position or change in position of the cab relative to the frame, etc.), use a model that associates locations with different operating modes to select an operating mode of the one or more functional devices of the vehicle, and then provide an output (e.g., the operating mode selected using the model). The controller may receive additional input of the change in operating mode that was selected, such as analysis of noise or interference in communication signals (or a lack thereof), operator input, or the like, that indicates whether the machine-selected operating mode provided a desirable outcome or not. Based on this additional input, the controller can change the model, such as by changing which operating mode would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

In accordance with one example or aspect, a vehicle may include a body having a front side, rear side, left side, and right side, and a cab that is movably coupled with the body. The cab may include a front end, a rear end, a left end, and a right end. The vehicle may include an actuator that is operably coupled with the cab and may move the cab between a first position and a second position. Moving the cab from the first position toward the second position may move the cab away from the right side of the body, and moving the cab from the second position toward the first position may move the cab toward the right side of the body.

Optionally, the actuator may be one of an electronic actuator, a hydraulic actuator, or a pneumatic actuator. Optionally, the vehicle may include one or more sensors and one or more processors that control operation of the actuator to move the cab from the second position to the first position responsive to the one or more sensors detecting an obstacle along a route of the vehicle. Optionally, the vehicle may include a display positioned in the cab that may display information obtained by the one or more sensors. Optionally, the first position may be a fully retracted position and the second position may be a fully extended position. The actuator may control movement of the cab to plural intermediate positions between the fully retracted position and the fully extended position. Optionally, the vehicle may include one or more processors that may control operation of the actuator to move the cab between the first position and the second position based at least in part on one or more characteristics of an upcoming portion of a route traveled by the vehicle. The characteristics may include a curvature of the upcoming portion of the route, an incline level of the upcoming portion of the route, or a type of pathway of the upcoming portion of the route. Optionally, the actuator may include a telescoping portion. Optionally, the vehicle may include one or more processors that may control operation of the actuator to control a stability level of one or more of the body or the cab.

In accordance with another example or aspect, a vehicle may include a frame having a front side, a rear side, a left side, and a right side that may define a frame perimeter. The vehicle may include a cab that is movably coupled with the frame. The cab may include a front end, a rear end, a left end, and a right end defining a cab perimeter. An actuator may be operably coupled with the cab. The actuator may move the cab between a retracted position and an extended position. The cab perimeter may be contained within the frame perimeter while the cab is in the retracted position, or a portion of the cab perimeter may be disposed outside of the frame perimeter while the cab is in the extended position.

Optionally, the vehicle may include one or more processors that may control operation of the actuator to move the cab between the extended position and the retracted position. Optionally, the vehicle may include one or more sensors that may sense one or more characteristics of an area surrounding the vehicle. The one or more processors may control operation of the actuator to move the cab from the extended position toward the retracted responsive to the one or more sensors detecting an obstacle along a route of the vehicle. Optionally, the vehicle may include one or more optical sensors that may be operably coupled with one or more of the frame or the cab. Optionally, the vehicle may include a visual display positioned in the cab that may display information obtained by the one or more optical sensors. Optionally, the actuator may move the cab to one or more intermediate positions between the retracted position and the extended position. Optionally, the vehicle may include one or more processors that may control operation of the actuator to move the cab between the retracted position and the extended position based at least in part on one or more characteristics of an upcoming portion of a route traveled by the vehicle. Optionally, the cab in the extended position may extend beyond one or more of the front side of the frame, the rear side of the frame, the left side of the frame, or the right side of the frame.

In accordance with another example or aspect, a vehicle may include a frame and a cab that may be movably positioned on the frame. An actuator may be operably coupled with the cab and may move the cab between a retracted position in which the cab is positioned within the frame and an extended position in which at least a portion of the cab extends beyond the frame.

Optionally, the vehicle may include one or more processors that may control operation of the actuator to move the cab from the extended position toward the retracted position responsive to output from one or more sensors indicating an obstacle along a route of the vehicle. Optionally, the vehicle may include one or more processors that may control operation of the actuator to move the cab based at least in part on one or more characteristics of an upcoming portion of a route traveled by the vehicle. Optionally, the actuator may move the cab to one or more intermediate positions between the extended position and the retracted position.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in another device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A vehicle, comprising:
a body having a front side, a rear side, a left side, and a right side;
a cab configured to be movably coupled with the body, the cab having a front end, a rear end, a left end, and a right end;
an actuator configured to be operably coupled with the cab,
wherein the actuator is configured to move the cab between a first position and a second position, wherein moving the cab from the first position toward the second position moves the cab away from the right side of the body, and moving the cab from the second position toward the first position moves the cab toward the right side of the body;
one or more sensors; and
one or more processors configured to control operation of the actuator to move the cab from the second position to the first position responsive to the one or more sensors detecting an obstacle along a route of the vehicle.

2. The vehicle of claim 1, wherein the actuator is one of an electronic actuator, a hydraulic actuator, or a pneumatic actuator.

3. The vehicle of claim 1, further comprising a display positioned in the cab configured to display information obtained by the one or more sensors.

4. The vehicle of claim 1, wherein the first position is a fully retracted position and the second position is a fully extended position, wherein the actuator is configured to control movement of the cab to plural intermediate positions between the fully retracted position and the fully extended position.

5. The vehicle of claim 1, wherein the one or more processors are configured to control operation of the actuator to move the cab between the first position and the second position based at least in part on one or more of characteristics of an upcoming portion of a route traveled by the vehicle, wherein the one or more characteristics of the route include one or more of a curvature of the upcoming portion of the route, an incline level of the upcoming portion of the route, or a type of pathway of the upcoming portion of the route.

6. The vehicle of claim 1, wherein the actuator includes a telescoping portion.

7. The vehicle of claim 1, wherein the one or more processors are configured to control operation of the actuator to control a stability level of one or more of the body or the cab.

8. A vehicle, comprising:
a frame defining a frame perimeter;
a cab defining a cab perimeter;
an actuator configured to be operably coupled with the cab,
wherein the actuator is configured to move the cab between a retracted position and an extended position, wherein the cab perimeter is configured to be contained within the frame perimeter while the cab is in the retracted position, and wherein a portion of the cab perimeter is configured to be disposed outside of the frame perimeter while the cab is in the extended position; and
one or more processors configured to control operation of the actuator to move the cab between the retracted position and the extended position based at least in part on one or more of characteristics of an upcoming portion of a route traveled by the vehicle, wherein the one or more characteristics of the route include one or more of a curvature of the upcoming portion of the route, an incline level of the upcoming portion of the route, or a type of pathway of the upcoming portion of the route.

9. The vehicle of claim 8, wherein:
the frame has a front side, a rear side, a left side, and a right side defining the frame perimeter; and
the cab has a front end, a rear end, a left end, and a right end defining the cab perimeter.

10. The vehicle of claim 9, wherein the cab in the extended position extends beyond one or more of the front side of the frame, the rear side of the frame, the left side of the frame, or the right side of the frame.

11. The vehicle of claim 8, further comprising one or more sensors configured to sense one or more characteristics of an area surrounding the vehicle, wherein the one or more processors are configured to control operation of the actuator to move the cab from the extended position toward the retracted position responsive to the one or more sensors detecting an obstacle along a route of the vehicle.

12. The vehicle of claim 8, further comprising one or more optical sensors operably coupled with one or more of the frame or the cab.

13. The vehicle of claim 12, further comprising a visual display positioned in the cab configured to display information obtained by the one or more optical sensors.

14. The vehicle of claim 8, wherein the actuator is configured to move the cab to one or more intermediate positions between the retracted position and the extended position.

15. A vehicle, comprising:
a frame;
a cab configured to be movably positioned on the frame;
an actuator configured to be operably coupled with the cab,
wherein the actuator is configured to move the cab between a retracted position in which the cab is positioned within the frame and an extended position in which at least a portion of the cab extends beyond the frame; and
one or more processors configured to control operation of the actuator to control a stability level of one or more of the frame or the cab.

16. The vehicle of claim 15, wherein the one or more processors are configured to control operation of the actuator to move the cab from the extended position toward the retracted position responsive to an output from one or more sensors indicating an obstacle along a route of the vehicle.

17. The vehicle of claim 15, wherein the one or more processors are configured to control operation of the actuator to move the cab based at least in part on one or more characteristics of an upcoming portion of a route traveled by the vehicle.

18. The vehicle of claim 15, wherein the actuator is configured to move the cab to one or more intermediate positions between the extended position and the retracted position.

\* \* \* \* \*